US010103545B2

United States Patent
Ding et al.

(10) Patent No.: US 10,103,545 B2
(45) Date of Patent: Oct. 16, 2018

(54) METHOD AND SYSTEM FOR DETECTING ISLANDING EFFECT IN POWER ELECTRICAL NETWORK TOPOLOGY

(71) Applicant: International Business Machines Corporation, Armonk, NY (US)

(72) Inventors: Jian D. Ding, Shanghai (CN); Feng Jin, Shanghai (CN); Yuhang Liu, Beijing (CN); Junmei Qu, Beijing (CN); Qi M. Tian, Beijing (CN); Ya N. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 14/526,989

(22) Filed: Oct. 29, 2014

(65) Prior Publication Data

US 2015/0120221 A1 Apr. 30, 2015

(30) Foreign Application Priority Data

Oct. 31, 2013 (CN) .......................... 2013 1 0532552

(51) Int. Cl.
*G01R 19/25* (2006.01)
*H02J 3/38* (2006.01)

(52) U.S. Cl.
CPC .......... *H02J 3/38* (2013.01); *H02J 2003/388* (2013.01)

(58) Field of Classification Search
CPC ................ Y02E 10/763; Y02E 10/563; H02J 2003/388; H02J 3/14; Y04S 20/222; H04L 41/12

(Continued)

(56) References Cited

U.S. PATENT DOCUMENTS 6,850,074 B2 2/2005 Adams et al.
7,376,491 B2 5/2008 Walling et al.
(Continued)

FOREIGN PATENT DOCUMENTS

CN 101777758 A 7/2010
CN 102262182 A 11/2011
CN 103091604 A 5/2013

OTHER PUBLICATIONS

Chinese Office Action date Apr. 21, 2017 from corresponding Chinese Application No. 201310532552.2 filed Oct. 31, 2013.
(Continued)

*Primary Examiner* — Roy Y Yi
*Assistant Examiner* — Jeffrey Aiello
(74) *Attorney, Agent, or Firm* — Andrew Aubert; Maeve M. Carpenter (57) ABSTRACT

In an approach for detecting islanding effect in a power electrical network topology, a computer processor finds, in the power electrical network topology, a point of common coupling between a load and a distributed generation with potential islanding effect as well as a substation supplying power to said point of common coupling; collects operating parameters of the power grid in vicinity of said point of common coupling as well as in vicinity of said substation; determines whether islanding effect exists in said distributed generation and the load in accordance with a variation characteristic of the operating parameters of the power grid in vicinity of said point of common coupling and the operating parameters of the power grid in vicinity of said substation. Higher degree of accuracy and sensitivity of detecting islanding effect is achieved without compromising the energy quality on user side according to embodiments of the present invention.

9 Claims, 5 Drawing Sheets

(58) Field of Classification Search
USPC .......................... 307/52; 700/291, 295, 298
See application file for complete search history.

(56) References Cited

U.S. PATENT DOCUMENTS

| | | | |
|---|---|---|---|
| 7,466,570 B2 | 12/2008 | Lin et al. | |
| 8,334,618 B2 | 12/2012 | Bhavaraju et al. | |
| 2004/0021470 A1 | 2/2004 | Adams et al. | |
| 2008/0204044 A1 | 8/2008 | Ponnaluri et al. | |
| 2010/0185336 A1* | 7/2010 | Rovnyak | H02J 3/38 700/287 |
| 2011/0276192 A1* | 11/2011 | Ropp | H02J 3/383 700/293 |
| 2012/0280673 A1* | 11/2012 | Watanabe | H02J 3/1885 323/304 |
| 2013/0051498 A1* | 2/2013 | Taft | G01R 19/2513 375/340 |
| 2013/0155734 A1 | 6/2013 | El-Barbari et al. | |
| 2013/0187454 A1* | 7/2013 | Timbus | H02J 3/381 307/23 |
| 2015/0015302 A1* | 1/2015 | Laaksonen | H02J 3/38 324/764.01 |
| 2015/0314696 A1* | 11/2015 | Wang | B60L 11/1842 701/22 |

OTHER PUBLICATIONS

Abdolrasol et al., "Hybrid Anti-Islanding Algorithm for Utility Interconnection of Distributed Generation", 2009 International Conference for Technical Postgraduates (TECHPOS), IEEE, Dec. 14-15, 2009, pp. 1-5, <http://ieeexplore.ieee.org/xpl/login.jsp?tp=&arnumber=5412095&url=http%3A%2F%2Fieeexplore.ieee.org%2Fxpls%2Fabs_all.jsp%3Farnumber%3D5412095>.

Bitaraf et al., "A Novel SVM Approach of Islanding Detection in Micro Grid", Innovative Smart Grid Technologies—Asia (ISGT Asia), 2012 IEEE, May 21-24, 2012, pp. 1-5, <http://ieeexplore.ieee.org/xpl/articleDetails.jsp?arnumber=6303335&navigation=1>.

El-Arroudi et al., "Intelligent-Based Approach to islanding Detection in Distributed Generation", IEEE Transactions on Power Delivery, vol. 22, Iss. 2, Apr. 2007, <http://ieeexplore.ieee.org/xpl/login.jsp?tp=&arnumber=4141116&url=http%3A%2F%2Fieeexplore.ieee.org%2Fxpls%2Fabs_all.jsp%3Farnumber%3D4141116>.

* cited by examiner

METHOD AND SYSTEM FOR DETECTING ISLANDING EFFECT IN POWER ELECTRICAL NETWORK TOPOLOGY

CROSS REFERENCE TO RELATED APPLICATION

This application claims the benefit of priority under 35 U.S.C. § 119 from Application Number 201310532552.2, filed on Oct. 31, 2013 in China.

TECHNICAL FIELD

The present invention relates to power electrical network, and more particularly, to a method and system for detecting islanding effect in the power electrical network topology.

BACKGROUND

Islanding effect is self power supply islanding phenomenon unable to be controlled by the power company where a distributed power generation system supplies power to surrounding loads, which is formed when power transmission and distribution operation ceases in the power supply system of the power company because of reasons such as faulty accident and outage maintenance, and the distributed power generation system installed at each user end fails to detect the condition of outage timely and therefore cannot isolate itself from the main electricity network. Islanding effect may adversely affect the equipment of an entire power distribution system and of user end, and associated personnel, including:

1) harming the life security of the power maintenance personnel;
2) affecting the protection switch action procedures in the power distribution system;
3) damaging appliances due to the unstable property of voltage and frequency of power supply in the islanding area;
4) re-tripping or damaging photovoltaic generation system, load, and power supply system which may be caused by the inrush current generated by voltage phase being non-synchronous when the power supply restores; and
5) inducing lack phase supply issues in three-phase load of system due to single-phase supply in the distributed generation system.

Existing methods for detecting islanding mainly include method of passive detection and method of active detection.

Method of passive detection: the passive method utilizes variation of voltage, frequency, phase, or harmonic at the output terminal of inverters when the power interrupts in the power grid for islanding effect detection. However, the method of passive detection will lose its ability to detect islanding effect under the situation where the output power of the distributed generation system is balanced with local load power. Also, the fundamental principle of this method is to monitor the data varying rate and determine if the data varying rate surpasses a pre-set threshold value, therefore there is a relatively large non-detection zone (NDZ). Consequently, the degree of accuracy and sensitivity of the detection result is not high.

Method of active detection: the active method causes certain disturbance of output power, frequency, or phase of the inverter by controlling the inverter. When the power grid operates normally, such disturbance is not detected due to balance action of the power grid. Once failure exists in the power grid, the disturbance output from the inverter will be accumulated rapidly and surpass the allowable range so that the islanding effect detection circuit will be triggered. However, this method has complicated control circuits and lowers the energy quality output from the inverter, thus the energy quality on user side will be affected significantly.

Therefore, a necessity exists for a method and system for detecting islanding effect with higher degree of accuracy and sensitivity and without compromising the energy quality on user side.

SUMMARY

According to one aspect of the present invention, there is provided a method for detecting islanding effect in the power electrical network topology, comprising: finding in the power electrical network topology a point of common coupling between a load and a distributed generation with potential islanding effect as well as a substation supplying power to said point of common coupling; collecting operating parameters of the power grid in vicinity of said point of common coupling as well as in vicinity of said substation; determining whether islanding effect exists in said distributed generation and the load in accordance with a variation characteristic of the operating parameters of the power grid in vicinity of said point of common coupling and the operating parameters of the power grid in vicinity of said substation.

According to the method and other embodiments of the present invention, there is achieved detecting islanding effect with higher degree of accuracy and sensitivity and without compromising the energy quality on user side.

BRIEF DESCRIPTION OF THE DRAWINGS

The above and other objectives, features, and advantages of the present disclosure will become more apparent by more detailed description of the exemplary implementations of the present disclosure in conjunction with the accompanying drawings, wherein like numeral references typically represent like components in the exemplary implementations of the present disclosure.

DETAILED DESCRIPTION

Preferred implementations of the present disclosure will be described below in more details by reference to the accompanying drawings. Although preferred implementations of the present disclosure are shown in the accompanying drawings, it should be understood that the present disclosure may be implemented in various forms without being limited by the implementations illustrated herein. On the contrary, these implementations are provided for the present disclosure to be more thorough and complete, as well as for scope of the present disclosure to be delivered fully to the skilled in the art.

Those skilled in the art shall know that the present invention may be embodied as system, method, or computer program product. Therefore, the present disclosure may be implemented particularly into the following forms, namely, it may be completely hardware, may also be completely software (including firmware, resident software, microcode, etc.), may still be in the form of combination of both hardware and software, which is referred to as "circuit", "module", or "system". Moreover, in some embodiments, the present invention may also be implemented in the form of computer program product in one or more computer readable medium which contains computer readable program code.

Any combination of one or more computer readable medium may be utilized. The computer readable medium may be computer readable signal medium or computer readable memory medium. The computer readable memory medium may for example be, but not limited to, electrical, magnetic, optic, electromagnetic, infrared, or semiconductor system, apparatus, or means, or any combination of the above. More specific examples of the computer readable memory medium (non-exhaustive list) comprise: electrical connection having one or more wire, portable computer magnetic disk, hard disk, random access memory (RAM), read only memory (ROM), erasable programmable read only memory (EPROM or flash memory), fiber optics, portable compact disk read only memory (CD-ROM), optic memory means, magnetic memory means, or any combination of the above. In the document, the computer readable memory medium may be any physical medium containing or storing program which may be used by or in combination with instruction executing system, apparatus, or means.

The computer readable signal medium may include data signal in the base band or propagated as a part of carrier, in which the computer readable program code is carried. Such propagated data signal may take a number of forms, including, but not limited to, electromagnetic signal, optic signal, or any suitable combination of the above. The computer readable signal medium may also be any computer readable medium which may send, propagate, or transmit program to be used by instruction executing system, apparatus, or means, or to be used therewith other than the computer readable memory medium.

The program code in the computer readable medium may be transmitted using any suitable medium, including, but not limited to, wireless, wire, optic cable, RF, etc, or any suitable combination of the above.

The computer program code used for executing the operation of the present invention may be written by one or more programming language or the combination thereof. The programming language includes object oriented programming language, such as Java, Smalltalk, C++, as well as conventional process oriented programming language, such as "C" language or similar programming language. The program code may be entirely executed on user's computer, partially executed on user's computer, executed as an independent software package, partially executed on user's computer and partially executed on remote computer, or entirely executed on remote computer or server. In the case where remote computer is involved, the remote computer may be connected to user's computer through any type of network, including local area network (LAN) or wide area network (WAN), or may be connected to external computer (e.g. with Internet connection using Internet service provider).

The following sets forth the description of the present invention by reference to the flow chart and/or block diagram of the method, apparatus (system), and computer program product of embodiments of the present invention. It should be understood that each block of the flow chart and/or block diagram and the combination of the blocks of the flow chart and/or block diagram may be implemented by computer program instructions. These computer program instructions may be provided to general computer, application specific computer, or other processor of programmable data processing means, so that a machine is produced. These computer program instructions are executed by computer or other programmable data processing means, producing the apparatus for implementing the functionalities/operations specified in the blocks of the flow chart and/or block diagram.

These computer program instructions may also be stored in computer readable medium which allows the computer or other programmable data processing means to work in a particular way, such that the instructions stored in the computer readable medium produce manufacture including instruction means for implementing the functionalities/operations specified in the flow chart and/or blocks of the block diagram.

These computer program instructions may also be loaded to computers, other programmable data processing means, or other devices, enabling a series of operational steps to be executed on computers, other programmable data processing means, or other devices to generate process implemented by computer, so that the instructions executed on computer or other programmable means are able to implement the process of the functionalities/operations specified in blocks of the flow chart and/or block diagram.

Figure 1:
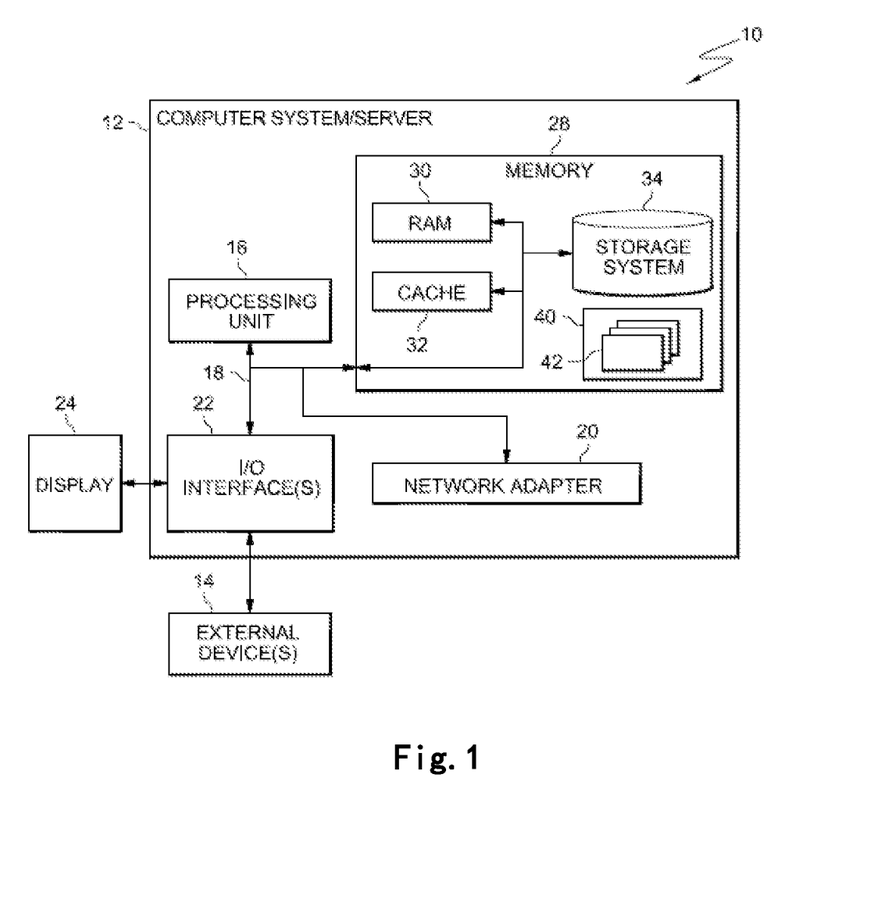
FIG. 1 shows a block diagram of an exemplary computer system/server for implementing an embodiment of the present invention.

FIG. 1 shows the block diagram of the exemplary computer system/server 12 adapted for implementing embodiments of the present invention. The computer system/server 12 shown in FIG. 1 is merely an example, which should by no means limit the functionalities and usable scope of embodiments of the present invention.

As shown in FIG. 1, the computer system/server 12 is manifested in the form of general computing device. The components of the computer system/server 12 may include but are not limited to: one or more processors or processing unit 16, a system internal memory 28, and a bus 18 connected to different system components (including system memory 28 and processing unit 16).

The bus 18 represents one or more types of several types of bus structure, including memory bus, or memory controller, peripheral bus, accelerated graphics port, processor, or local bus using any bus structure in several bus structures. For example, these structures include but not limited to Industrial Standard Architecture (ISA) bus, Micro Channel Architecture (MAC) bus, enhanced ISA bus, Video Electronics Standards Association (VESA) local bus, and Peripheral Component Interconnection (PCI) bus.

The computer system/server 12 typically comprises a number of computer system readable medium. These medium may be any available medium that can be accessed by the computer system/server 12, including volatile and non-volatile medium, movable and non-movable medium.

The system memory 28 may include computer system readable medium in the form of volatile memory, for example random access memory (RAM) 30 and/or high speed cache memory 32. The computer system/server 12 may further include other movable/non-movable, and volatile/non-volatile computer system memory medium. Only taken as an example, memory storage system 34 may be used to read/write non-movable, non-volatile magnetic medium (not shown in FIG. 1, often referred to as "hard disk drive"). Although not shown in FIG. 1, it is provided the magnetic disk drive used for movable non-volatile magnetic disk (e.g. "floppy disk") to read/write, and the optic disk drive used for movable non-volatile optical disk (e.g. CD-ROM, DVD-ROM, or other optic medium) to read/write. In these cases, each drive may be connected with bus 18 via one or more data medium interfaces. The memory 28 may comprise at least one program product which has a group (e.g. at least one) of program module configured to execute the functionalities of each embodiment of the present invention.

Program/utility tool 40 having one group (at least one) of program module 42 may be stored in for example memory 28. Such program module 42 includes, but not limited to, operational system, one or more applications, other program module, and program data. It is possible for each one or a certain combination of these examples to include implementations of network environment. The program module 42 typically executes the functionalities and/or method described in the embodiments of the present invention.

The computer system/server 12 may also communicate with one or more external devices 14 (e.g. keyboard, pointing device, display 24, etc.), may also communicate with one or more devices enabling user to interact with the computer system/server 12, and/or may also communicate with any device (e.g. network card, modem, etc.) enabling the computer system/server 12 to communicate with one or more other computing devices. Such communication may be carried out via input output (I/O) interface 22. In addition, the computer system/server 12 may also communicate with one or more networks (e.g. local area network (LAN), wide area network (WAN) and/or public network, e.g. Internet) through network adapter 20. As shown in the figure, network adapter 20 communicates with other modules of the computer system/server 12 through the bus 18. It should be understood that although not shown in the figure, other hardware and/or software module may be used in conjunction with the computer system/server 12, including but not limited to: microcode, device drive, redundant process unit, external magnetic disk drive array, RAID system, magnetic tape drive, and data backup storage system, etc.

Figure 2:
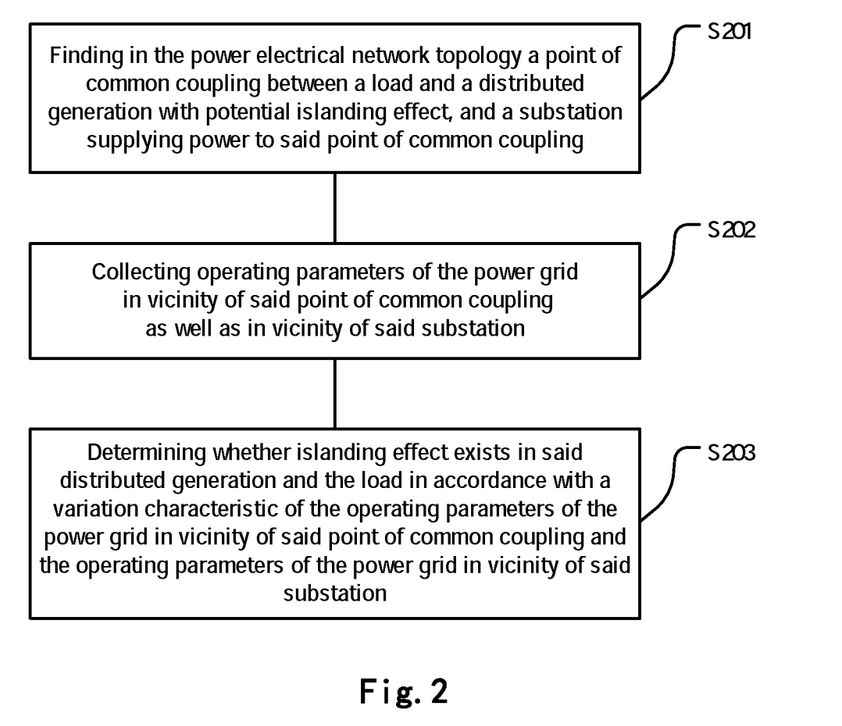
FIG. 2 shows a method for detecting islanding effect in a power electrical network topology according to an embodiment of the present invention.

Now referring to FIG. 2, FIG. 2 illustrates the method for detecting islanding effect in the power electrical network topology according to an embodiment of the present invention, comprising: in step S201, finding in the power electrical network topology a point of common coupling between a load and a distributed generation with potential islanding effect, and a substation supplying power to the point of common coupling; in step S202, collecting operating parameters of the power grid in vicinity of the point of common coupling as well as in vicinity of the substation; in step S203, determining whether islanding effect exists in said distributed generation and the load in accordance with a variation characteristic of the operating parameters of the power grid in vicinity of said point of common coupling and the operating parameters of the power grid in vicinity of said substation.

In step S201, finding in the power electrical network topology a point of common coupling between a load and a distributed generation with potential islanding effect, and a substation supplying power to the point of common coupling.

The power electrical system is an entirety where power electrical components such as generator, transformer, busbar, switch, disconnector, line, and the like are connected in a certain form. The electrical operating performance of the power electrical system is subject to the restriction of component characteristic and connecting relation between components. Taking the restriction of component characteristic and the restriction of connecting relation in the power electrical system into consideration, the power electrical network topology in fact contains two types of topology: geometric topology and physical topology. The geometric topology reflects geometric connection state of the equipments in the power grid, while the physical topology reflects physically electrical coupling relationships of the components in the power grid. The method for detecting islanding effect of embodiments of the present invention is analyzed based on the power electrical network topology.

Distributed Generation (DG) is typically referred to as a highly efficient and reliable generation unit of small-scale modularization, distributed type, arrangement in vicinity of users with the generated power from several kilo watts (KW) to hundreds of mega watts (MW) (some suggest the power being restricted under 30-50 MW). Distributed generation primarily comprises: an internal combustion engine fueled with liquid or gas, a micro scale gas turbine, solar energy generation (photovoltaic battery or photo-thermal generation), wind power generation, and biomass power generation, etc.

In the graph of power electrical network topology, finding a common point between load and distributed generation as the point of common coupling (PCC) between the load and the distributed generation with potential islanding effect, then finding the substation supplying power for the point of common coupling.

In step S202, collecting operating parameters of the power grid in vicinity of said point of common coupling and in vicinity of the said substation, by providing sensors in vicinity of the point of common coupling and in vicinity of the substation supplying power for the point of common coupling, and collecting in real time current, voltage, frequency, phase, and harmonic distribution in vicinity of the point of common coupling as well as in vicinity of the substation. According to an embodiment of the present invention, the area in vicinity of the point of common coupling is area in the power electrical network topology between the points of common coupling with the exception of a transmission line and without surpassing other power electrical equipments, the area in vicinity of the substation is area in the power electrical network topology between outlet terminals of the substation with the exception of the transmission line and without surpassing other power electrical equipments.

In step S203, determining whether islanding effect exists in said distributed generation and the load in accordance with the variation characteristic of the operating parameters of the power grid in vicinity of the point of common coupling and the operating parameters of the power grid in vicinity of said substation.

The variation characteristic of the operating parameters of the power grid in vicinity of the point of common coupling and the operating parameters of the power grid in vicinity of the substation includes at least one of the following: power variation characteristic, harmonic distribution variation characteristic, harmonic distortion variation characteristic in vicinity of the point of common coupling as well as in vicinity of the substation.

According to an embodiment of the present invention, observing simultaneously the variation characteristic of the operating parameters of the power grid in vicinity of the point of common coupling and the operating parameters of the power grid in vicinity of the substation, determining that islanding effect exists in the distributed generation and the load if the variation characteristic of the operating parameters of the power grid in vicinity of the point of common coupling and the operating parameters of the power grid in vicinity of the substation complies with at least one of the following conditions: the power variation characteristic in vicinity of the point of common coupling as well as in vicinity of the substation being complementary within certain time period; the harmonic distribution variation characteristic in vicinity of the point of common coupling as well as in vicinity of the substation having correlation characteristic within certain time period; the harmonic distortion variation characteristic in vicinity of the point of common coupling as well as in vicinity of the substation having the same feature for the impact curve within certain time period.

The power variation characteristic in vicinity of the point of common coupling and in vicinity of the substation being complementary means that within certain time period, the power of the point of common coupling tending to increase results in the power in vicinity of the substation tending to decrease, or the power of the point of common coupling tending to decrease results in the power in vicinity of the substation tending to increase, with the amount of increase and decrease being substantially equal. This is because the power in vicinity of the substation will vary due to the load being decreased or increased during the island being formed. Correspondingly, the power in vicinity of the point of common coupling will vary in a reverse way due to the respective load being decreased or increased. As a result, the power in vicinity of the point of common coupling as well as in vicinity of the substation is complementary.

The harmonic distribution variation characteristic in vicinity of the point of common coupling as well as in vicinity of the substation having correlated characteristic means the harmonic distribution curves in vicinity of the point of common coupling and those in vicinity of the substation are substantially similar within a certain time period regardless of time delay. The harmonic distribution variation characteristic in vicinity of the point of common coupling as well as in vicinity of the substation having correlated characteristic is because a great amount of harmonic distribution will occur in vicinity of the substation during the island being formed, and such harmonic distribution has corresponding features with the operating parameters of the power grid during an island being formed. Likewise, a great amount of harmonic distribution will occur in vicinity of the point of common coupling. Such harmonic distribution also has corresponding features with the operating parameters of the power grid during an island being formed. As a result, harmonic distributions in vicinity of the point of common coupling as well as in vicinity of the substation have correlated characteristics within a certain time period.

The harmonic distortion in vicinity of the point of common coupling as well as in vicinity of the substation having the same feature for the impact curve means the harmonic distortion in vicinity of the point of common coupling and in vicinity of the substation within a certain time period has the impact curve in same direction, and the peak value of the impact curve may be different. This is because during an island being formed, the operating parameters of the power grid will vary, particularly a great amount of harmonic distortion will occur in vicinity of the point of common coupling as well as in vicinity of the substation. The harmonic distortion occurs within a relatively short time period; as a result, the impact curve in same direction is produced.

According to an embodiment of the present invention, potential islanding effect in the power grid is identified using the observed parameter variation trend by collecting the operating parameters in vicinity of the point of common coupling and the substation, observing simultaneously the two groups of power grid operating parameters, and comparing the variation trends for the two groups of power grid operating parameters. Therefore, sensitivity and accuracy of islanding detection is improved, and the inherent disadvantages of the existing methods in terms of parameter collection and threshold valve setting for parameter variation rate are overcome.

Figure 3:
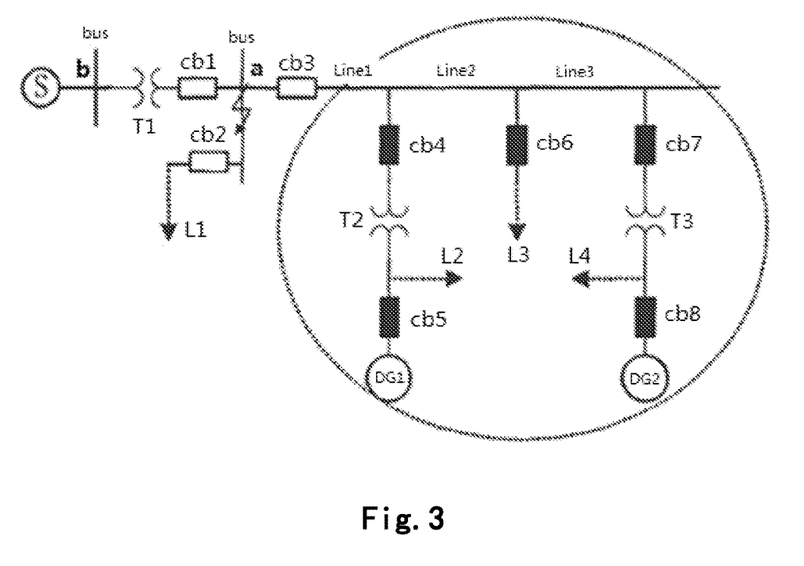
FIG. 3 shows the power electrical network topology according to an embodiment of the present invention.

FIG. 3 shows the power electrical network topology according to an embodiment of the present invention. For the convenience of description, only a small portion of some area in the power electrical network topology is selected as the network topology for exemplary description. As shown in the figure, the power electrical network topology comprises distributed generations DG1, DG2, loads L1, L2, L3, and L4, circuit breakers cb1, cb2, cb3, cb4, cb5, cb6, cb7, and cb8, transformers T1, T2, and T3, and substation S. The common point "a" is found between distributed generations DG1, D2 and loads L1, L2, L3, and L4, and can be denoted as the point of common coupling "PCC." Then, the substation "S" which supplies power to the point of common coupling PCC is found, and the observation spot "b" in vicinity of the outlet terminal of the substation as "PPS" (Point of Power Supply). Sensors are set in vicinity of the PCC for collecting in real time the current, voltage, frequency, phase, harmonic distribution, and harmonic distortion in vicinity of the point of common coupling. Sensors are set in vicinity of the PPS for collecting in real time the current, voltage, frequency, phase, harmonic distribution, and harmonic distortion in vicinity of the outlet terminal of the substation.

Observed is the power grid operating parameters in vicinity of the point of common coupling, the power variation characteristic curves, harmonic distribution variation characteristic curves, and harmonic distortion variation characteristic curves in vicinity of the substation.

Figure 4:
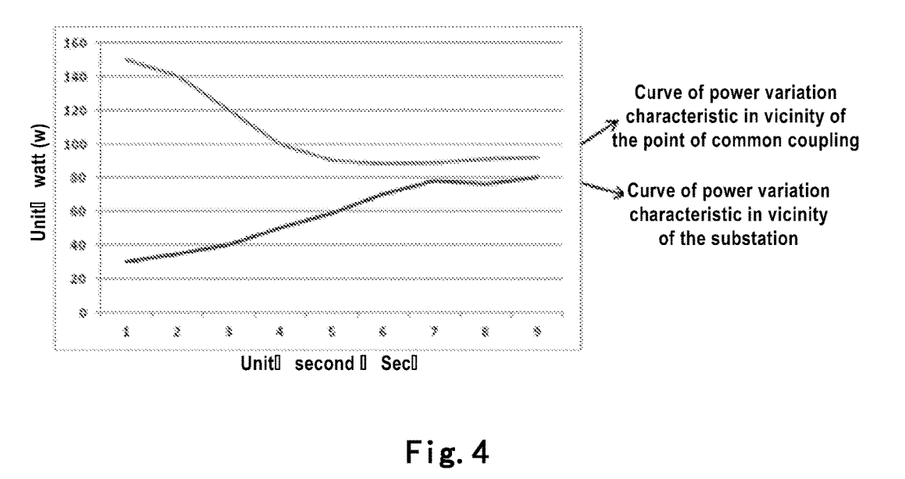
FIG. 4 shows curves of the power variation characteristic in vicinity of the point of common coupling as well as in vicinity of the substation of the embodiment in FIG. 3.
Figure 5:
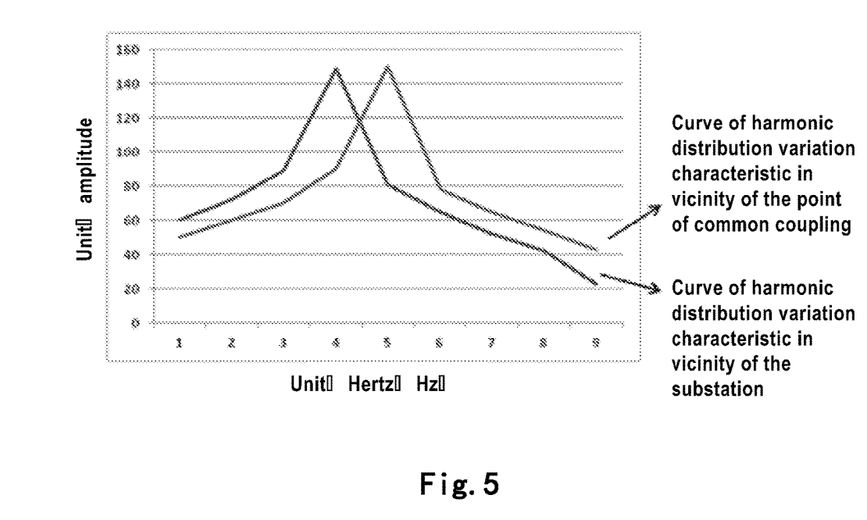
FIG. 5 shows curves of the harmonic distribution variation characteristic in vicinity of the point of common coupling as well as in vicinity of the substation of the embodiment in FIG. 3.
Figure 6:
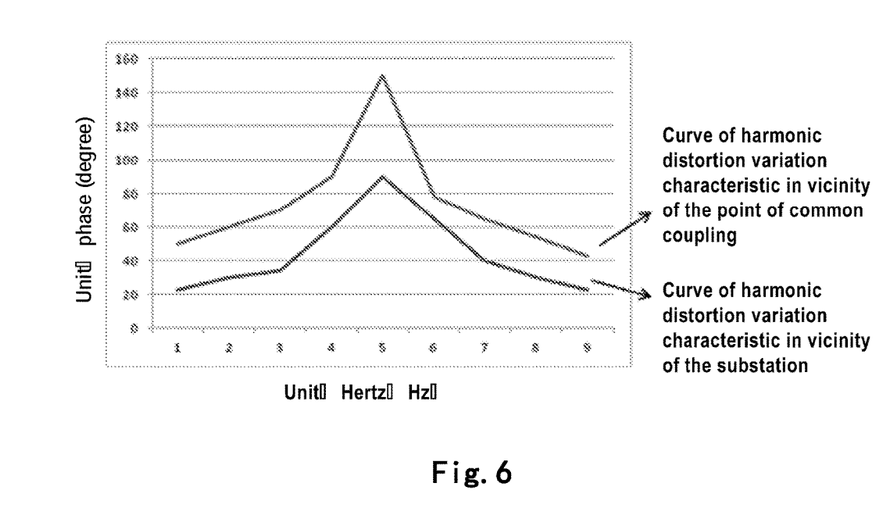
FIG. 6 shows curves of the harmonic distortion variation characteristic in vicinity of the point of common coupling and in vicinity of the substation of the embodiment in FIG. 3.

FIG. 4 shows the curves of the power variation characteristic in vicinity of the point of common coupling and in vicinity of the substation of the embodiment in FIG. 3. As shown in the figure, the power variation characteristics in vicinity of the point of common coupling and the substation are apparently complementary. FIG. 5 shows the curves of the harmonic distribution variation characteristic in vicinity of the point of common coupling as well as in vicinity of the substation of the embodiment in FIG. 3. As shown in the figure, the harmonic distribution curves in vicinity of the point of common coupling as well as in vicinity of the substation in a certain time period are substantially similar and correlated. FIG. 6 shows the curves of the harmonic distortion variation characteristic in vicinity of the point of common coupling as well as in vicinity of the substation of the embodiment in FIG. 3. As shown in the figure, the harmonic distortion in vicinity of the point of common coupling as well as in vicinity of the substation in a certain time period have impact curves in same direction, thus have same impact curve features.

Therefore, islanding effect in the distributed generations DG1, DG2, and the surrounding loads L1, L2, L3, and L4 may be determined in the embodiment illustrated in FIG. 3, as shown in the circular dash lined area. For the purpose of illustration, the above mentioned three of variation characteristic curves are analyzed. In practical application, one or two of the variation characteristic curves may be observed in order to determine islanding effect.

According to an embodiment of the present invention, it further includes: searching whether an equipment failure exists in vicinity of the points of common coupling as well as in vicinity of the substations from monitoring results of a power grid operation monitoring system; correcting the power grid operating parameters in vicinity of the point of common coupling and/or the operating parameters of the power grid in vicinity of the substation in response to determination of existence of the equipment failure in vicinity of the point of common coupling and/or in vicinity of the substation; wherein determining whether islanding effect exists in the distributed generation and the load in accordance with the variation characteristic of the power grid operating parameters in vicinity of the point of common coupling and the power grid operating parameters in vicinity of the substation includes: replacing the variation characteristic of the operating parameters of the power grid in vicinity of the point of common coupling and/or the operating parameters of the power grid in vicinity of the substation with the corrected variation characteristic of operating parameters of the power grid in vicinity of the point of common coupling and/or the operating parameters of the power grid in vicinity of the substation for determining whether islanding effect exists in the distributed generation and the load.

Specifically, correcting the power grid operating parameters in vicinity of the point of common coupling and/or the power grid operating parameters in vicinity of the substation in response to determining that equipment failure exists in vicinity of the point of common coupling as well as in vicinity of the substation; determining whether islanding effect exists in the distributed generation and the load in accordance with the corrected power grid operating parameters in vicinity of the point of common coupling and the corrected variation characteristic of the power grid operating parameters in vicinity of the substation. Wherein, correcting the power grid operating parameters in vicinity of the point of common coupling and the power grid operating parameters in vicinity of the substation comprises: processing the operating parameters of the power grid in vicinity of the point of common coupling and the operating parameters of the power grid in vicinity of the substation with at least one of the following: smoothing in time domain and filtering in frequency domain.

Correcting the power grid operating parameters in vicinity of the point of common coupling in response to determining that equipment failure exists in vicinity of the point of common coupling; determining whether islanding effect exists in the distributed generation and the load in accordance with the variation characteristic of the power grid operating parameters in vicinity of the substation and the corrected power grid operating parameters in vicinity of the point of common coupling and the corrected variation characteristic of the power grid operating parameters in vicinity of the substation. Wherein, correcting the power grid operating parameters in vicinity of the point of common coupling comprises: processing the operating parameters of the power grid in vicinity of the point of common coupling with at least one of the following: smoothing in time domain and filtering in frequency domain.

Correcting the power grid operating parameters in vicinity of the substation in response to determining that equipment failure exists in vicinity of the substation; determining whether islanding effect exists in the distributed generation and the load in accordance with the power grid operating parameters in vicinity of the point of common coupling and the corrected power grid operating parameters in vicinity of the substation. Wherein, correcting the power grid operating parameters in vicinity of the substation comprises: processing the operating parameters of the power grid in vicinity of the point of the substation with at least one of the following: smoothing in time domain and filtering in frequency domain.

Searching whether an equipment failure exists in vicinity of the point of common coupling as well as in vicinity of the substation in monitoring results of a power grid operation monitoring system, specifically, searching for power gird operation failure record from monitoring results of the power grid operation monitoring system, searching whether an equipment failure exists in vicinity of the point of common coupling as well as in vicinity of the substation in the power grid topology in accordance with the power grid operation failure record, recording the location and type of the equipment failure if an equipment failure exists.

If an equipment failure exists in vicinity of the point of common coupling and/or in vicinity of the substation, the power grid operating parameters in vicinity of the point of common coupling and/or the power grid operating parameters in vicinity of the substation, then the power grid operating parameters in vicinity of the point of common coupling and/or the power grid operating parameters in vicinity of the substation are unreliable, it is required to correct the power grid operating parameters in vicinity of the point of common coupling and/or the power grid operating parameters in vicinity of the substation. The failure type generally includes transformer failure, line short circuit, switch re-closing, and circuit breaker tripping, and so on. The power grid operating parameters in vicinity of the point of common coupling and/or the power grid operating parameters in vicinity of the substation are corrected particularly in connection with the failure type. For example, transformer failure will cause the frequency to vary and introduce harmonics, thus it is required to filter the unexpected harmonics. Line short circuit will cause overloading of current and voltage in time domain, thus it is required to smooth the current and voltage. Switch re-closing will introduce relatively large harmonics, and the current and voltage will jump, thus it is required to smooth the current and voltage as well as filter the unexpected harmonics. Circuit breaker tripping will cause the current and voltage to jump dramatically, thus it is required to smooth the current and voltage.

According to one embodiment of the present invention, smoothing the power grid operating parameters may be realized by using the method of averaging adjacent data. A number of collected adjacent power grid operating parameters are averaged as values of the parameters after de-noise, by collecting the power grid operating parameters a period of time before the failure occurs, such as current and voltage.

According to another embodiment of the present invention, smoothing the power grid operating parameters may be realized by using the method of regression curve modeling. Specifically, the power grid operating parameters and the point in time corresponding to the parameters within a period of time before the failure occurs, for example current and voltage as well as the corresponding point in time, may be fit into a curve with the independent variable being the point in time of that moment the dependent variable being the power grid operating parameters, while the power grid operating parameters after the failure occurs may be obtained by substituting the present point in time into the curve.

Those skilled in the art should understand that there are various kinds of methods to realize the smoothing process which is not limited to the above mentioned two embodiments. As long as the method is able to smooth the power grid operating parameters, it falls within the scope of the present invention.

Those skilled in the art should understand that harmonics filtering may be realized by using high-pass filter and low-pass filter. The implementation of high-pass filter and low-pass filter belongs to common general knowledge in the art, thus it is omitted in the present invention.

In the above mentioned three embodiments, the method of determining whether islanding effect exists in the distributed generation and the load after correcting the unreliable power grid operating parameters is the same with step S203. The detailed method can be referred to as step S204 and is omitted herein. In the above mentioned three embodiments, equipment failure is detected, once equipment failure in vicinity of the point of common coupling and/or in vicinity of the substation is found, the unreliable power grid operating parameters collected are corrected. The method for correcting includes smoothing in time domain and filtering in frequency domain, and so on. Then, the corrected parameters are used as the power grid operating parameters for detecting islanding effect. The correction of parameters enables detection result of islanding effect to have good robustness with regard to noise of power grid operating parameters caused by various kinds of faults, and more accurate detection results.

The respective embodiments for implementing the present invention are described by reference to the accompanying drawings in the above. Those skilled in the art may understand that the above mentioned methods may be implemented with software, hardware, or a combination of software and hardware. Additionally, those skilled in the art may understand that an apparatus for detecting islanding effect in power electrical network topology may be provided by the respective steps in the above mention methods in way of software, hardware, or a combination of software and hardware. Even though the apparatus is same with general processing device in terms of hardware structure, the apparatus demonstrates properties which differentiated itself from the general processing devices due to the software contained therein, thus forming the apparatuses of the respective embodiments of the present invention.

Figure 7:
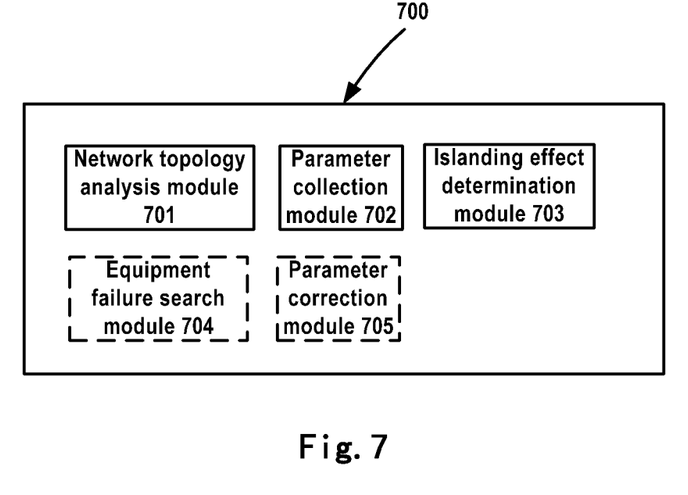
FIG. 7 shows an apparatus for detecting islanding effect in the power electrical network topology according to an embodiment of the present invention.

In the following, apparatus 700 for detecting islanding effect in the power electrical network topology according to one embodiment of the present invention will be described in details by reference to FIG. 7. The apparatus 700 comprises: a network topology analysis module 701 for finding in the power electrical network topology a point of common coupling between a load and a distributed generation with potential islanding effect, and a substation supplying power to the point of common coupling; a parameter collection module 702 configured to collect the operating parameters of the power grid in vicinity of the point of common coupling as well as in vicinity of the substation; an islanding effect determination module 703 configured to determine whether islanding effect exists in the distributed generation and the load in accordance with a variation characteristic of the operating parameters of the power grid in vicinity of the point of common coupling and the operating parameters of the power grid in vicinity of the substation.

According to an embodiment of the present invention, wherein the vicinity of said point of common coupling therein is an area in the power electrical network topology between the points of common coupling with the exception of the transmission line and without surpassing other power electrical equipments, the vicinity of the substation is an area in the power electrical network topology between outlet terminals of the substation with the exception of the transmission line and without surpassing other power electrical equipment.

According to an embodiment of the present invention, the apparatus 700 further comprises: an equipment failure search module 704 configured to search whether an equipment failure exists in vicinity of the point of common coupling as well as in vicinity of the substation from monitoring results of a power grid operation monitoring system; a parameter correction module 705 configured to correct the operating parameters of the power grid in vicinity of the point of common coupling and/or the operating parameters of the power grid in vicinity of the substation in response to determination of the equipment failure in vicinity of the point of common coupling and/or in vicinity of the substation; wherein, the islanding effect determination module 703 is further configured to replace the operating parameters of the power grid in vicinity of the point of common coupling and/or the operating parameters of the power grid in vicinity of the substation with the corrected operating parameters of the power grid in vicinity of the point of common coupling and/or the operating parameters of the power grid in vicinity of the substation to determine whether islanding effect exists in the distributed generation and the load through.

According to an embodiment of the present invention, the parameter correction module therein is configured to process the operating parameters of the power grid in vicinity of the point of common coupling and/or the operating parameters of the power grid in vicinity of the substation with at least one of the following: smoothing in time domain and filtering in frequency domain.

According to an embodiment of the present invention, the variation characteristic of the operating parameters of the power grid in vicinity of the point of common coupling and the operating parameters of the power grid in vicinity of the substation comprises at least one of the following: power variation characteristic, harmonic distribution variation characteristic, harmonic distortion variation characteristic in vicinity of the point of common coupling as well as in vicinity of the substation.

According to an embodiment of the present invention, the islanding effect determination module 703 is further configured to determine that islanding effect exists in the distributed generation and the load if the variation characteristic of the operating parameters of the power grid in vicinity of the point of common coupling and the operating parameters of the power grid in vicinity of the substation complies with at least one of the following conditions: the power variation characteristic in vicinity of the point of common coupling and the power variation characteristic in vicinity of the substation being complementary within certain time period; the harmonic distribution variation characteristic in vicinity of the point of common coupling and the harmonic distribution variation characteristic in vicinity of the substation having correlated characteristic within certain time period;

the harmonic distortion variation characteristic in vicinity of the point of common coupling and the harmonic distortion variation characteristic in vicinity of the substation having the same feature for the impact curve within certain time period.

The specified implementation method with regard to each one of the above mentioned modules refers to the detailed description of the method for detecting islanding effect in the power electrical network topology according to the embodiments of the present invention, therefore it is omitted herein.

The flow charts and block diagrams in the accompanying drawings illustrate the architectures, functionalities, and operations that may be realized in the system, method, and computer program product according to a plurality of embodiments of the present invention. With regard to this point, each block in the flow charts or block diagrams may represent one module, one section of the program, or one part of the code. The module, one section of the program, or one part of the code includes one or more executable instructions for realizing the specified logical function. It should also be noted that the functions labeled in the blocks may take place in a different order than the sequence as labeled in the accompanying drawings. For example, two sequential blocks practically may be performed substantially in parallel, and they may also be performed as a reverse order, which is decided according to the related functions. It is also to be noted that each block of the block diagrams and/or the flow charts, and the combination of the blocks of the block diagrams and/or the flow charts may be performed using specific hardware based system for executing specified function or operation, or may be performed using the combination of specific hardware and computer instructions.

The respective embodiments of the present invention have been described in the above. The aforementioned description is exemplary, non-exhaustive, and not limited to the disclosed respective embodiments. Numerous modifications and variations are apparent to the ordinary skilled in the art without departing from the scope and spirit of the respective embodiments as illustrated. The selection of the used terms herein is intended to best explain the principle, practical application, or the technical improvement to the techniques on the market of the respective embodiments, or to allow other ordinary skilled in the art to understand the respective embodiments disclosed herein.

What is claimed is:

1. A method comprising:
   finding, by one or more computer processors, in an electrical power network, a point of common coupling between a load with a distributed generator, which is potentially subject to an islanding effect, and a substation supplying power to the point of common coupling;
   sensing, by one or more sensors, power grid operating parameters in vicinity of the point of common coupling and the substation;
   collecting, by one or more processors, the power grid operating parameters in vicinity of the point of common coupling and the substation;
   determining, by one or more computer processors, that the islanding effect exists in the load with the distributed generator in response to determining at least one of the following conditions for the power grid operating parameters in vicinity of the point of common coupling and the substation: (i) that a power metric in vicinity of the point of common coupling and in vicinity of the substation are complementary over a selected time interval, (ii) that harmonic distribution variation data as a function of frequency in vicinity of the point of common coupling and in vicinity of the substation is correlated over a certain time interval, and (iii) that harmonic distortion data in vicinity of the point of common coupling and in vicinity of the substation has similar curvature;
   responsive to the determination that the islanding effect exists in the load, determining a type of equipment failure, based, at least in part, on the conditions for the power grid operating parameters in vicinity of the point of common coupling and the substation, with the types of equipment failure including: (i) transformer failure, (ii) line short circuit, (iii) switch re-closing, and (iv) circuit breaker tripping;
   responsive to determining a type of equipment failure, determining a correction to the power grid operating parameters, where the correction is based, at least in part, on type of equipment failure, with the correction for a transformer failure is to filter unexpected harmonics, the correction for a line short circuit is smoothing both current and voltage, the correction for a switch re-closing is filtering unexpected harmonics and smoothing both current and voltage, and the correction for a circuit breaker tripping is smoothing both current and voltage; and
   applying the determined correction to the power grid operating parameters in vicinity of the point of common coupling and the substation based on the determined correction;
   wherein:
   a power metric is at least one of: (i) current, (ii) voltage, (iii) frequency, and (iv) phase.

2. The method according to claim 1, wherein the vicinity of the point of common coupling is an area in the electrical power network between the point of common coupling with an exception of a transmission line and without surpassing other electrical power equipment, and the vicinity of the substation is an area in the electrical power network between outlet terminals of the substation with an exception of a transmission line and without surpassing other electrical power equipment.

3. The method according to claim 1, wherein the power grid operating parameters in vicinity of the point of common coupling and the substation are simultaneously observed.

4. A computer program product comprising:
   a non-transitory machine readable storage device; and
   computer code stored on the non-transitory machine readable storage device, with the computer code including instructions for causing a processor(s) set to perform operations including the following:
   finding, by one or more computer processors, in an electrical power network, a point of common coupling between a load with a distributed generator, which is potentially subject to an islanding effect, and a substation supplying power to the point of common coupling,
   sensing, by one or more sensors, power grid operating parameters in vicinity of the point of common coupling and the substation,
   collecting, by one or more processors, the power grid operating parameters in vicinity of the point of common coupling and the substation,
   determining, by one or more computer processors, that the islanding effect exists in the load with the distributed generator in response to determining at least one of the following conditions for the power grid operating parameters in vicinity of the point of common coupling and the substation: (i) that a power metric in vicinity of the point of common coupling and in vicinity of the substation are complementary over a selected time interval, (ii) that harmonic distribution variation data as a function of frequency in vicinity of the point of common coupling and in vicinity of the substation is correlated over a certain time interval, and (iii) that harmonic distortion data in vicinity of the point of common coupling and in vicinity of the substation has similar curvature, responsive to the determination that the islanding effect exists in the load, determining a type of equipment failure, based, at least in part, on the conditions for the power grid operating parameters in vicinity of the point of common coupling and the substation, with the types of equipment failure including: (i) transformer failure, (ii) line short circuit, (iii) switch re-closing, and (iv) circuit breaker tripping, responsive to determining a type of equipment failure, determining a correction to the power grid operating parameters, where the correction is based, at least in part, on type of equipment failure, with the correction for a transformer failure is to filter unexpected harmonics, the correction for a line short circuit is smoothing both current and voltage, the correction for a switch re-closing is filtering unexpected harmonics and smoothing both current and voltage, and the correction for a circuit breaker tripping is smoothing both current and voltage; and applying the determined correction to the power grid operating parameters in vicinity of the point of common coupling and the substation based on the determined correction;

wherein:

a power metric is at least one of: (i) current, (ii) voltage, (iii) frequency, and (iv) phase.

5. The computer program product according to claim 4, wherein the vicinity of the point of common coupling is an area in the electrical power network between the point of common coupling with an exception of a transmission line and without surpassing other electrical power equipment, and the vicinity of the substation is an area in the electrical power network between outlet terminals of the substation with an exception of a transmission line and without surpassing other electrical power equipment.

6. The computer program product according to claim 4, wherein the power grid operating parameters in vicinity of the point of common coupling and the substation are simultaneously observed.

7. A computer system comprising:

a processor(s) set;

a machine readable storage device; and computer code stored on the machine readable storage device, with the computer code including instructions for causing the processor(s) set to perform operations including the following:

finding, by one or more computer processors, in an electrical power network, a point of common coupling between a load with a distributed generator, which is potentially subject to an islanding effect, and a substation supplying power to the point of common coupling, sensing, by one or more sensors, power grid operating parameters in vicinity of the point of common coupling and the substation, collecting, by one or more processors, the power grid operating parameters in vicinity of the point of common coupling and the substation, determining, by one or more computer processors, that the islanding effect exists in the load with the distributed generator in response to determining at least one of the following conditions for the power grid operating parameters in vicinity of the point of common coupling and the substation: (i) that a power metric in vicinity of the point of common coupling and in vicinity of the substation are complementary over a selected time interval, (ii) that harmonic distribution variation data as a function of frequency in vicinity of the point of common coupling and in vicinity of the substation is correlated over a certain time interval, and (iii) that harmonic distortion data in vicinity of the point of common coupling and in vicinity of the substation has similar curvature, responsive to the determination that the islanding effect exists in the load, determining a type of equipment failure, based, at least in part, on the conditions for the power grid operating parameters in vicinity of the point of common coupling and the substation, with the types of equipment failure including: (i) transformer failure, (ii) line short circuit, (iii) switch re-closing, and (iv) circuit breaker tripping, responsive to determining a type of equipment failure, determining a correction to the power grid operating parameters, where the correction is based, at least in part, on type of equipment failure, with the correction for a transformer failure is to filter unexpected harmonics, the correction for a line short circuit is smoothing both current and voltage, the correction for a switch re-closing is filtering unexpected harmonics and smoothing both current and voltage, and the correction for a circuit breaker tripping is smoothing both current and voltage; and applying the determined correction to the power grid operating parameters in vicinity of the point of common coupling and the substation based on the determined correction;

wherein:

a power metric is at least one of: (i) current, (ii) voltage, (iii) frequency, and (iv) phase.

8. The computer system according to claim 7, wherein the vicinity of the point of common coupling is an area in the electrical power network between the point of common coupling with an exception of a transmission line and without surpassing other electrical power equipment, and the vicinity of the substation is an area in the electrical power network between outlet terminals of the substation with an exception of a transmission line and without surpassing other electrical power equipment.

9. The computer system according to claim 7, wherein the power grid operating parameters in vicinity of the point of common coupling and the substation are simultaneously observed.

* * * * *